United States Patent [19]

Kashiwazaki et al.

[11] Patent Number: 4,891,760
[45] Date of Patent: Jan. 2, 1990

[54] ON-BOARD NAVIGATION SYSTEM FOR MOTOR VEHICLES

[75] Inventors: Takashi Kashiwazaki; Hitoshi Ando, both of Tokorozawa, Japan

[73] Assignee: Pioneer Electronic Corporation, Tokyo, Japan

[21] Appl. No.: 248,092

[22] Filed: Sep. 23, 1988

[30] Foreign Application Priority Data

Sep. 29, 1987 [JP] Japan .................................. 62-245615
Sep. 29, 1987 [JP] Japan .................................. 62-245617

[51] Int. Cl.$^4$ ........................................... G06F 15/50
[52] U.S. Cl. ..................................... 364/443; 364/449; 340/990; 340/995
[58] Field of Search ............... 364/443, 449, 483, 550, 364/521; 73/178 R; 340/988, 990, 995; 371/66

[56] References Cited

U.S. PATENT DOCUMENTS

| | | | |
|---|---|---|---|
| 4,307,455 | 12/1981 | Juhasz et al. | 371/66 |
| 4,323,987 | 4/1982 | Holtz et al. | 371/66 |
| 4,458,307 | 7/1984 | McAnlis et al. | 371/66 |
| 4,532,514 | 7/1985 | Hatano et al. | 340/995 |
| 4,611,289 | 9/1986 | Coppola | 371/66 |
| 4,689,747 | 8/1987 | Kurose et al. | 340/995 |
| 4,763,333 | 8/1988 | Byrd | 371/66 |
| 4,815,012 | 3/1989 | Feintuch | 340/995 |

*Primary Examiner*—Gary Chin
*Attorney, Agent, or Firm*—Fleit, Jacobson, Cohn, Price, Holman & Stern

[57] ABSTRACT

An on-board navigation system for motor vehicles comprises a first storage medium in which map data in digital form is stored, a control device for gathering map data of a region having a given area including a present location of the vehicle from a first storage medium, and to display a map on a display screen on the basis of the gathered map data, and a second storage medium of non-volatile type into and from which data is written and read-out. The control device is operative to memorize, at the time of the turn-off of a power supply of the vehicle, data gathered immediately before a fall of the power in the second storage medium, and to display the map at the time of a rise-up of the power supply on the basis of the data memorized in the second storage medium.

2 Claims, 5 Drawing Sheets

DISPLAY AREA

GRAPHIC MEMORY AREA

ROAD

1H  | 0 0 0 0 0 1 1 0 0 0 1 1 0 0 0 | ---- | 1 0 0 0 0 0 |

2H  | 0 0 0 0 1 1 0 0 0 1 1 0 0 0 0 | ---- | 0 1 0 0 0 0 |

3H  | 0 0 0 1 1 0 0 0 1 1 0 0 0 0 0 | ---- | 0 0 1 0 0 0 |

"1": A PLACE ON WHICH A ROAD RUNS

ON-BOARD NAVIGATION SYSTEM FOR MOTOR VEHICLES

BACKGROUND OF THE INVENTION

1. Field of the Invention

The present invention relates to a navigation system to be mounted in a motor vehicle.

2. Description of Background Information

Recently, on-board navigation systems (navigation system to be mounted in a vehicle) for motor vehicles are developed, in which map data in digital form is stored in a memory and a map of a region around the present location of the vehicle is displayed on a display by reading-out, from the memory map, data of the region having a given area including the present location of the vehicle while recognizing the present location of the vehicle, and the location of the vehicle itself is automatically indicated on the map being displayed.

Since the map data is treated in numerical form in these navigation systems, a semiconductor memory having a large memory capacity and a display unit operable at high speeds are required in order to display a map on a display screen on the basis of the map data. Moreover, the map data in numerical form has a considerable data amount in order to satisfy various demands. Therefore, after the rise-up of the power supply of the vehicle with the so-called accessory switch of the vehicle on, the access to the memory is required quite a number of times in order to read-out the map data around the vehicle. Since a fairly long time is consumed by this operation, a time period is required from the rise-up of the power supply before the map is displayed on the screen.

Moreover, since the map data is inherently a two-dimensional data in these navigation systems, it is necessary to divide a map into parts by grids and to store the map data of each part in succession following an order indicated by the arrows in FIG. 1 so that the map data is arranged in one-dimensional manner in the memory. If the stored data is expanded with respect to the time axis, the map data is designated as shown in FIG. 2A. In this figure, numerals ①②③, and ④ represent a data group on a particular reduced scale, and numerals ①②, ③, and ④ represent a data group on another reduced scale. Thus, a plurality of map data on a plurality of reduced scales constitute one data group for each part defined by grids, and the map data is stored in the memory in blocks of each data group. Therefore, as is apparent from the FIG. 2A, the map data of each part defined by grids are stored in the memory at locations separated with each other in terms of the time axis.

Therefore, if the display of a map is to be made around a place, it is necessary to fetch related map data from dispersed memory locations. Moreover, since the map data carries a large amount of information, a considerably long time is required before completing to fetch all of the related data and displaying the map subsequently. Thus, the display of the map is not started until a period of time elapses after the rise-up of the power supply of the vehicle with the accessory switch on.

OBJECT AND SUMMARY OF THE INVENTION

The present invention is based on the recognition of the above problems, and an object of the present invention is therefore to provide an on-board navigation system for motor vehicles, in which a map can be displayed on the display screen immediately after the rise-up of a power supply of the vehicle.

According to the present invention, an on-board navigation system for motor vehicles is adapted to gather map data of a region having a given area including a present location of the vehicle from a first storage medium in which map data in digital form is stored, and to display a map on a display screen on the basis of the gathered map data, and the system is provided with a second storage medium of non-volatile type into and from which data is written and read-out, and devised that data gathered immediately before a fall of a power supply of the vehicle is memorized in the second storage medium at the time of the turn-off of the power supply, and the map is displayed at the time of rise-up of the power supply on the basis of the data memorized in the second storage medium.

According to another aspect of the present invention, an on-board navigation system for motor vehicles is adapted to read-out map data of a region having a given area including a present location of the vehicle from a first storage medium in which map data in digital form is stored, to store the read-out map data into a semiconductor memory as picture data, and to display a map on a display screen on the basis of the picture data, and the system is provided with a second storage medium of non-volatile type into and from which data is written and read-out, and devised that data gathered immediately before a fall of a power supply of the vehicle is memorized in the second storage medium at the time of the turn-off of the power supply, and the map is displayed at the time of a rise-up of the power supply on the basis of the data memorized in the second storage medium.

DETAILED DESCRIPTION OF THE PREFERRED EMBODIMENTS

The embodiments of the present invention will be described with reference to the accompanying drawings.

Figure 3:
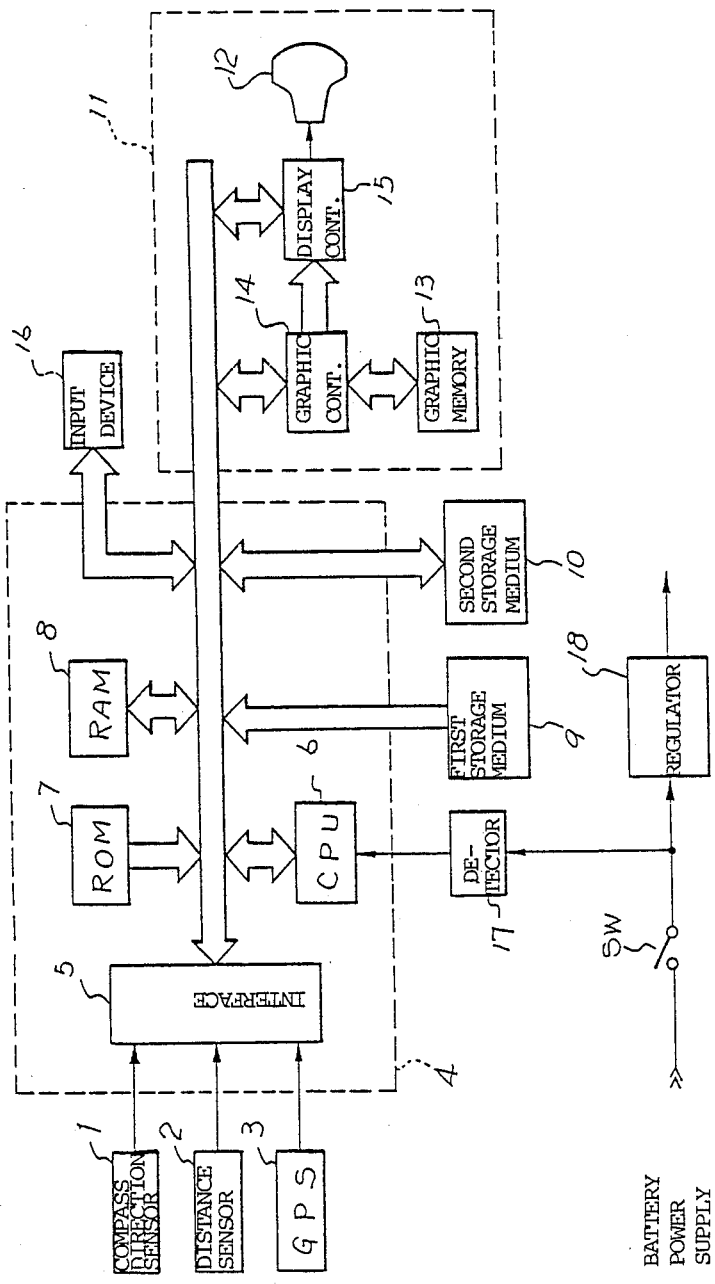
FIG. 3 is a block diagram showing the construction of the on-board navigation system according to the present invention.

FIG. 3 is a block diagram showing the construction of the on-board navigation system according to the present invention. In the figure, the numeral 1 denotes a compass direction sensor which determines the direction of the vehicle on the basis of terrestrial magnetism (magnetic field of the earth), for example. The reference numeral 2 denotes a distance sensor for sensing the traveling distance of the vehicle, and the reference numeral 3 denotes a GPS (Global Positioning System) for detecting the present location of the vehicle from information of longitude and latitude, etc. Detection outputs of these sensors and system are supplied to a system controller 4.

The system controller 4 is made up of an interface 5 which receives the detection outputs from the sensors (or system) 1 through 3 and performs the processes such as an A/D (Analog to Digital) conversion, a microprocessor 6 which performs various image processing operations, and operations for calculating the traveling distance of vehicle and a rate of change in the traveling direction of the vehicle with respect to the distance on the basis of output data of the sensors (or the system) 1 through 3 supplied from the interface 5, a ROM (Read Only Memory) 7 in which various processing programs of the CPU 6 and other necessary information are previously stored, a RAM (Random Access Memory) 8 into and from which information necessary for executing programs is written and read-out.

As external memory devices, the system is provided with a first storage medium 9 of non-volatile type which is used for only reading-out and a second storage medium 10 of non-volatile type which is used both for writing and reading-out. The first storage medium 9 is made up of a CD (Compact Disc) ROM or an IC card, or the like, having a large capacity, in which digitized (in the numerical form) map data is stored. When the vehicle is running, the CPU 6 determines the present location of the vehicle on the basis of the output data of the compass direction sensor 1, the distance sensor 2, and the GPS 3, and gathers from the first storage medium 9 the map data of a region of a given area including the present location of the vehicle, and temporarily stores the gathered data in the RAM 8, and also supplies them to a display unit 11.

Figures 4, 5:
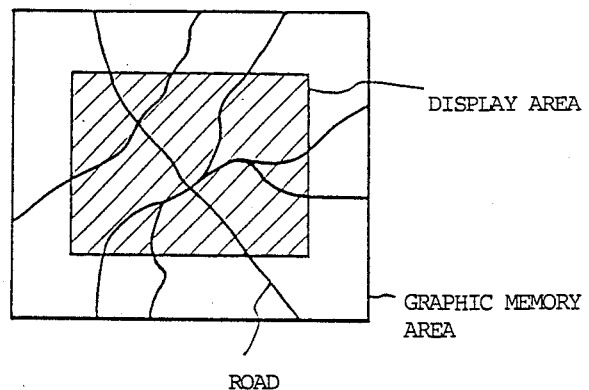
FIG. 4 is a diagram showing the relation between memory areas in the graphic memory and actual display areas.
FIG. 5 is a diagram showing picture data written in the graphic memory.

The display unit 11 is made up of a display 12 such as a CRT, a graphic memory 13 made up of a V(Video)-RAM for example, a graphic controller 14 which draws the map data supplied from the system controller 4 in the graphic memory 13 as image data, and outputs this image data, and a display controller 15 which performs control operations to display a map on the CRT display 12 on the basis of image data outputted by the graphic controller 14. In the graphic memory 13, road data of a map such as shown in FIG. 4 is written as image data, and image data of an area shown by oblique lines in this figure will be actually displayed on the display 12. In addition, FIG. 5 shows a state of memorization of the image data written in the graphic memory 13. In this figure, the numeral "1" represents a point on which a road runs, and the numeral "0" represents a point on which no road exists.

Furthermore, when the power supply of the vehicle is turned-off with the accessory switch off, the CPU 6 stores the map data memorized in the RAM 8 in the second storage medium 10. At the time of the rise-up of the power supply of the vehicle with the accessory switch on, the CPU 6 reads-out the map data memorized in the second storage medium 10 and temporarily stores them in the RAM 8, and supplies them to the display unit 11. The rise-up and the turn-off of the power supply of the vehicle is detected by means of a detection circuit 17 which monitors the state of the output signal of the accessory switch. Moreover, the power supply of the vehicle from a battery (not shown), flowing through the accessory switch, is stabilized at a regulator 18, and in turn supplied to various parts of the vehicle as the power current. The output voltage of the regulator 18 does not decrease to zero immediately after the accessory switch is turned-off, owing to time constant of the circuit. Therefore, the map data is memorized in the second storage medium 10 during this period of decrease. At the time of transferring the image data to the second storage medium 10, the memory capacity can be reduced by employing a known method of data compression. For example, by counting the number of consecutive "1"s or "0"s in the data shown in FIG. 5, and transferring the counted number, data compression of the image data can be implemented. However, in the navigation system according to the present invention, the use of the manner of storing the image data as shown in FIGS. 4 and 5 and the above mentioned data compression method are not limitative. In addition, DAT (digital audio tape) or the IC card can be used as the second storage medium 10 of non-volatile type. Moreover, a semiconductor memory, such as a RAM with a back-up power supply, can be used as the second storage medium 10. With the semiconductor memory, the writing and the reading of the image data can be executed more rapidly.

An input device 16 such as a keyboard is provided, so that various commands and the like are supplied to the system controller 4 by keying operation of the user.

Referring to the flowcharts of FIGS. 6 and 7, the procedures in a mode of rise-up of the power supply of the vehicle and a mode of turn-off of the power supply of the vehicle in the first embodiment of the present invention will be explained hereinafter.

Figure 1:
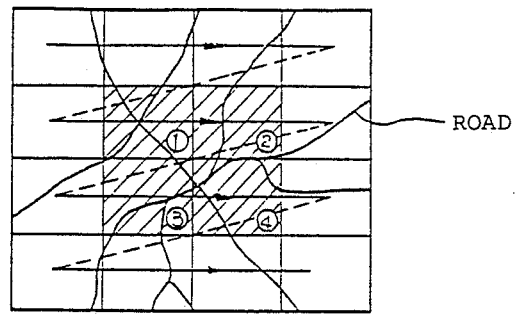
FIG. 1 is a diagram for showing a method of memorizing map data in a memory.
Figure 2A:
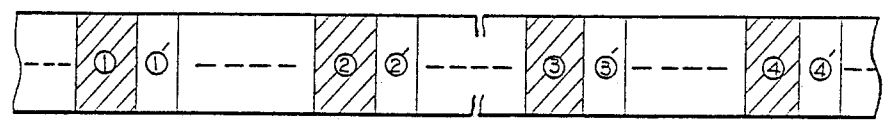
FIGS. 2A and 2B are diagrams respectively showing the state of storing the map data in first and second storage media, expanded with respect to time axis.
Figure 6:
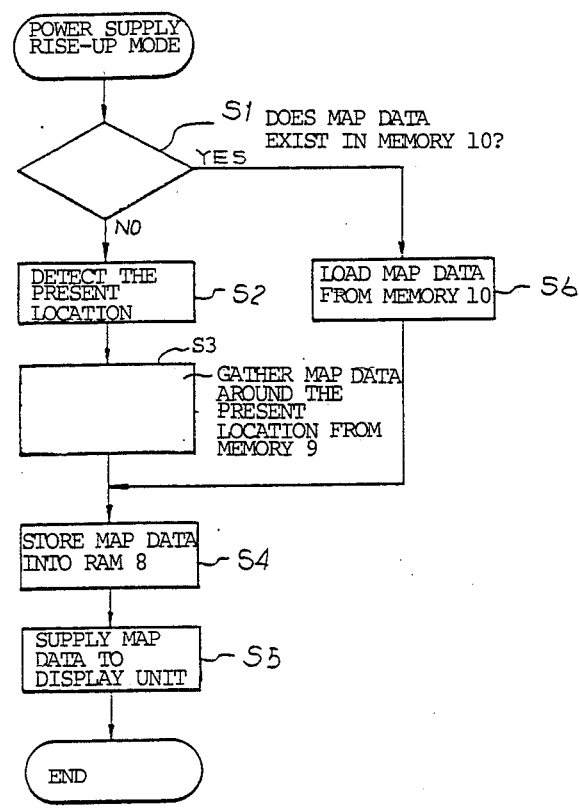
FIG. 6 is a flowchart showing an operational procedure executed by the CPU in the mode of rise-up of the power supply of the vehicle, in a first embodiment of the present invention.

In FIG. 6 showing the flow of operations in the rise-up mode, the CPU 6 at first determines whether or not map data is stored in the second storage medium 10 at a step S1, immediately after the accessory switch SW is turned on. In an initial state where no trip history using the navigation system itself exists, no map data is stored in the second storage medium 10. The CPU 6 then determines the present location of the vehicle on the basis of each output data of the compass direction sensor 1, the distance sensor 2, and the GPS 3 at a step S2. Subsequently, the CPU 6 reads-in map data of a region of a given area including the present location of the vehicle from the first storage medium 9, at a step S3. Since the map data stored in the first storage medium 9 is dispersed on the time axis as illustrated in FIG. 2A, a several times of accesses are needed to read in the map data of the region around the present location of the vehicle in sequence. Moreover, additional accesses are needed to read-in map data of different reduced scale. In this embodiment, the reduced scale of the map data to be read at first is fixed at a constant value, and map data of the other reduced scale are fetched by using idle times of the communication between the CPU 6 and the storage medium 9.

Subsequently, the CPU 6 stores the data gathered from the first storage medium 9 in the RAM 8 at a step S4, and at the same time supplies them to the display unit 11 at a step S5. In the display unit 11, the graphic controller 14 draws the map data supplied from the CPU 6 in the graphic memory 13 as image data, and supplies the image data to the display controller 15. Then the display controller 15 executes control operations for displaying the position of the vehicle itself together with the map around the present location of the vehicle on the display 12 on the basis of this image data.

On the other hand, if it is judged at the step S1 that map data is stored in the second storage medium 10, the CPU 6 loads the map data from the second storage medium 10 at a step S6. Subsequently, the program proceeds to the step S4 in which the map data is stored in the RAM 8 and supplied to the display unit 11.

By the operations explained above, the map data corresponding to the present location of the vehicle is fetched immediately from the second storage medium 11 by only one access at the time of rise-up of the power supply of the vehicle under conditions other than the initial state, without the necessity of gathering the data from the first storage medium 9. Thus, the map is immediately displayed on the display 12 at the time of the rise-up of the power supply of the vehicle.

Figure 2B:
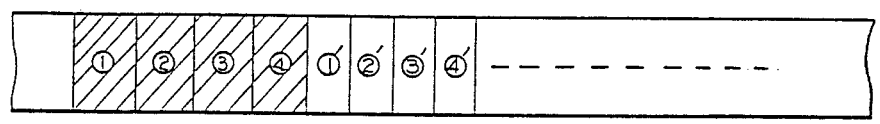
Figure 7:
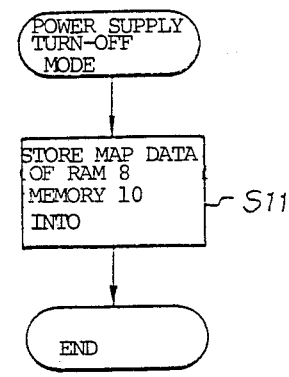
FIG. 7 is a flowchart showing an operational procedure executed by the CPU in a mode of fall of the power supply of the vehicle, in the first embodiment of the present invention.

The explanation of the embodiment of the present invention will be continued with reference to FIG. 7 showing the flow of operations in the mode of turn-off of the power supply of the vehicle. When the accessory switch SW is turned off, the CPU 6 stores the map data which is temporarily stored in the RAM 8 into the second storage medium 10 during the decreasing period of the output voltage of the regulator 18, at a step S11. By this operation, the map data of a region around the present location of the vehicle at the time the accessory switch of the vehicle is turned off is stored in the second storage medium 10 of the non-volatile type. Each map data stored in the RAM 8 and the second storage medium 10 is stored in successive form as illustrated in FIG. 2B, which is contradistinctive from the map data in the first storage medium 9 shown in FIG. 2A.

Therefore, as explained before, when the accessory switch of the vehicle is turned on, the map data of a region around the vehicle is immediately obtained by reading out the map data fro the second storage medium 10, without the necessity of gathering the map data from the first storage medium 9.

The writing of the map data has completed, the power supply relay 11 is turned-off (opened), to stop the supply of the power current to the external memory device 10, at a step S5. Then, the above sequential operations come to an end.

In the above embodiment, the system is devised to store the map data memorized in the RAM 8 into the second storage medium 10 when during the period of decrease of the power supply of the vehicle. However, it is also possible to arrange the system such that when the map data is gathered from the first storage medium 9 and stored in the RAM 8, the gathered map data is also stored in the second storage medium 10, and the map data in the second storage medium is renewed every time the map data is gathered from the first storage medium 9.

As explained above, according to the present invention, in an on-board navigation system for motor vehicles is adapted to gather map data of a region having a given area including a present location of the vehicle from a first storage medium in which map data in digital form is stored, and to display a map on a display screen on the basis of the gathered map data, the system is devised that, at a time of turn-off of a power supply of the vehicle, data gathered immediately before a fall of the power supply is memorized in the second storage medium, and the map is displayed at the time of rise-up of the power supply on the basis of the data memorized in the second storage medium. Thanks to this feature, the map data can be obtained by only one access at the time of the rise-up of the power supply, so that the map of a region around the present location of the vehicle is quickly displayed on the display screen.

Turning to the flowcharts of FIGS. 8 and 9, operations according to the second embodiment of the present invention will be explained hereinafter.

Figures 8, 9:
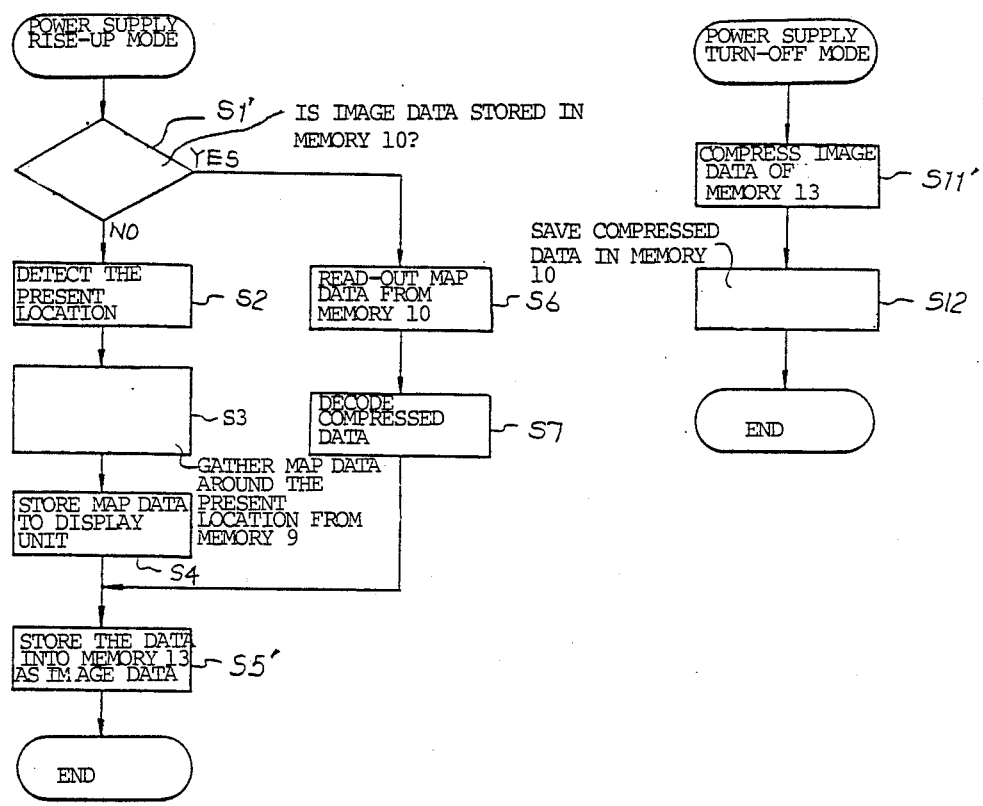
FIG. 8 is a flowchart showing an operational procedure executed by the CPU in the mode of rise-up of the power supply of the vehicle, in a second embodiment of the present invention.
FIG. 9 is a flowchart showing an operational procedure executed by the CPU in the mode of fall of the power supply of the vehicle, in the second embodiment of the present invention.

FIG. 8 shows the operations in the mode of rise-up time of the power supply of the vehicle, in which whether or not image data is stored in the second storage medium is judged at a step S1'. Since the operations at steps S2 through S4 are identical to corresponding steps S2 through S4 shown in FIG. 6, the explanation thereof will not be repeated. After the step S4, the CPU 6 supplies the map data to the display unit 11 and controls the graphic controller 14 so that the map data is stored in the graphic memory 13 as image data, at a step S5'.

On the other hand, if it is judge, at the step S1, that the image data is stored in the second storage medium 10, the CPU 6 reads-out the image data stored in the second storage medium 10 for example by using the data compression, at a step S6. Then the previous compressed data is decoded to original image data at a step S7. After the step S7, the program proceeds to the step S5 where the graphic controller 14 is operated to store the image data in the graphic memory 13, and to supply it to the display controller 15. By this feature, at times of the rise-up of the power supply of the vehicle other than the initial state, the image data is fetched quickly from the second storage medium 10 by only one access, without necessity of gathering map data corresponding to the present location of the vehicle from the first storage medium 9, and converting it to image data subsequently. Thus, a map can be quickly displayed on the display screen at the time of the rise-up of the power supply of the vehicle.

Turning to FIG. 9, an operational flow in the mode of the turn-off of the power supply of the vehicle will be explained. When the accessory switch is turned-off, the CPU 6 executes, at a step S11', a data compression operation of the image data which is temporarily stored in the graphic memory 13, during a period of a fall of the output voltage of the regulator 18. Subsequently, the compressed data is saved in the second storage medium 10 at a step 12. By these operations, the image data of a region around the present location of the vehicle at the time when the accessory switch is turned-off is stored in the second storage medium 10 of non-volatile type. Therefore, as explained before, when the accessory switch is turned-on, the image data around the present location of the vehicle is quickly acquired by reading-out the compressed data from the storage medium 10, and decoding it to the image data, without the necessity of gathering the map data from the first storage medium 9 and converting it to image data.

In the above embodiment, the system is devised to store the image data memorized in graphic memory 13 into the second storage medium 10 when during the period of the fall of the power supply of the vehicle. However, it is also possible to arrange the system such that when the image data is written into the graphic memory 13, the image data is also stored in the second storage medium 10, and the image data in the second storage medium is renewed every time the image data in the graphic memory 13 is rewritten.

As explained above, according to the present invention, in an on-board navigation system for motor vehicles is adapted to gather map data of a region having a given area including a present location of the vehicle from a first storage medium in which map data in digital form is stored, store the read-out map data in a semiconductor memory as image data and to display a map on a display screen on the basis of the image data, the system is devised that, at a time of turn-off of a power supply of the vehicle, image data at a time immediately before a fall of the power supply is memorized in the second storage medium of non-volatile type, and the map is displayed at the time of rise-up of the power supply on the basis of the data memorized in the second storage medium. Thanks to this feature, the map data can be obtained by only one access at the time of the rise-up of the power supply, so that the map of a region around the present location of the vehicle is quickly displayed on the display screen.

In addition, by storing the image data itself in the second storage medium instead of the map data, the amount of data to be stored can be much reduced, as compared with the case where the map data is stored. Therefore, a storage medium having a less storage capacity can be used, and the time required for reading-out data can be shortened. Thus, the display of a map is quickly executed at the time of rise-up of the power supply of the vehicle.

What is claimed is:

1. An on-board navigation system for a motor vehicle, said on-board navigation system comprising:
   first memory means for storing map data in digital form;
   control means for gathering map data of a region having a given area including a present location of the vehicle from said first memory means, and to display a map on a display screen on the basis of the gathered map data; and
   second memory means of a non-volatile type into and from which said map data is written and read-out, wherein said second memory means is operated by said control means to memorize, at the time of a turn-off of a power supply of the vehicle, said map data gathered immediately before a fall of the power supply of the vehicle , and said display screen displays the map at the time of a return of the power supply on the basis of the map data memorized in the second memory means.

2. An on-board navigation system for a motor vehicle, said on-board navigation system comprising:
   first memory means for storing map data in digital form;
   control means for performing a control operation to read-out map data of a region having a given area including a present location of the vehicle from the first memory means;
   a semiconductor memory for memorizing the map data read-out from the first memory means as image data;
   display means for displaying a map on a display screen on the basis of the image data memorized in the semiconductor memory; and
   second memory means of a non-volatile type into and from which map data is written and read-out, wherein said second memory means is operated by said control means to memorize, at the time of turn-off of a power supply of the vehicle, said image data at a time immediately before a fall of the power supply, and said display means displays the map at the time of a return of the power supply on the basis of the image data memorized in the second memory means.

* * * * *